United States Patent
Rypan

(10) Patent No.: US 6,624,399 B2
(45) Date of Patent: Sep. 23, 2003

(54) SPACE SAVING COOKING APPLIANCE

(76) Inventor: Zenon Rypan, 6489 Hallen Ave., Belvidere, IL (US) 61008-9383

(*) Notice: Subject to any disclaimer, the term of this patent is extended or adjusted under 35 U.S.C. 154(b) by 0 days.

(21) Appl. No.: 09/992,467

(22) Filed: Nov. 14, 2001

(65) Prior Publication Data

US 2002/0060219 A1 May 23, 2002

Related U.S. Application Data

(60) Provisional application No. 60/279,292, filed on Mar. 28, 2001, and provisional application No. 60/248,891, filed on Nov. 15, 2000.

(51) Int. Cl.[7] .................................................. H05B 6/80
(52) U.S. Cl. ..................... 219/680; 219/685; 219/756; 219/754; 219/739; 219/762; 126/37 R; 312/236
(58) Field of Search ................................ 219/756, 757, 219/762, 763, 680, 685, 689, 754, 739; 312/236, 237, 238; 126/37 R

(56) References Cited

U.S. PATENT DOCUMENTS

| | | | | |
|---|---|---|---|---|
| 1,612,730 A | * | 12/1926 | Keichline | 126/37 R |
| 3,358,669 A | * | 12/1967 | Schibley | 126/37 R |
| 4,107,502 A | | 8/1978 | Tanaka et al. | 219/10.55 F |
| 4,400,045 A | * | 8/1983 | Baschin | 312/236 |
| 4,745,246 A | * | 5/1988 | Hori et al. | 219/685 |
| 4,748,308 A | | 5/1988 | Drews | 219/10.55 E |
| 4,873,406 A | | 10/1989 | Connor | 219/10.55 E |
| 4,889,042 A | | 12/1989 | Hantz et al. | 99/340 |
| D305,969 S | | 2/1990 | Saito | D7/350 |
| 4,985,607 A | * | 1/1991 | Oya | 219/685 |
| D340,381 S | | 10/1993 | Mermillod | D7/309 |
| 5,632,921 A | | 5/1997 | Risman et al. | 219/750 |
| 5,990,466 A | | 11/1999 | McKee et al. | 219/746 |
| 6,011,249 A | | 1/2000 | Chung | 217/726 |
| 6,034,363 A | * | 3/2000 | Barmatz et al. | 219/756 |
| D427,838 S | | 7/2000 | Lee | D7/329 |
| D439,795 S | | 4/2001 | Ivanouskas | D7/351 |
| 6,231,137 B1 | * | 5/2001 | Lye et al. | 312/236 |
| D444,992 S | | 7/2001 | Brady et al. | D7/350 |
| D446,418 S | | 8/2001 | Cruz | D7/350.4 |
| D447,905 S | | 9/2001 | Smith-Berry et al. | D7/350 |

FOREIGN PATENT DOCUMENTS

| | | | | |
|---|---|---|---|---|
| GB | 2 266 039 | * | 10/1993 | |
| JP | 2-140512 | * | 5/1990 | 219/685 |
| KR | 2001-035894 | * | 5/2001 | |

\* cited by examiner

Primary Examiner—Philip H. Leung
(74) Attorney, Agent, or Firm—Clifford Kraft

(57) ABSTRACT

A space saving cooking appliance having a shape that conserves counter space and/or room space with either a prism shaped outer case that has an apex in the rear to match a corner, or a flat back that can be pushed up against a wall. The front of the appliance can be curved forming a part of an ellipse or circle. The cooking space inside the appliance can be cylindrical. On the front of the arcuate surface there can be a door that completes the arcuate surface when it closes, and on its inner side is shaped so that it completes the cylindrical cooking space when it is closed. Auxiliary side appliances can be located left and right of the main cooking area. These auxiliary appliances can be stacked and can be of many different types including a toaster, rotisserie, grill, broiler, BBQ, egg cooker, coffee maker.

22 Claims, 9 Drawing Sheets

SPACE SAVING COOKING APPLIANCE

This application is related to and claims priority from provisional applications No. 60/248,891 filed Nov. 15, 2000 and No. 60/279,292 filed Mar. 28, 2001. These provisional applications are hereby incorporated by reference.

BACKGROUND

1. Field of the Invention

This invention relates to the field of cooking appliances and more particularly to a space saving cooking appliance with a cylindrical or partially spherical heating cavity.

2. Description of Related Art

Ovens, and particularly microwave ovens, have traditionally been shaped as parallelepipeds with rectangular cross sections. These box type ovens, roasters, toasters, etc. do not make optimum use of the space available in a typical kitchen. Also, in most microwave ovens, the cooking cavity is rectangular while the turntable is round. This results in considerable wasted space as well as to microwave modes typical to rectangular cavities. It is well known that these modes lead to hot and cold spots in the cavity.

There have been some attempts to construct microwave ovens of different shape. U.S. Design Pat. No. D439,795 teaches an oven with a cut-off front. In other words, looking down from the top, one sees an oven with a corner cut off.

U.S. Pat. No. 4,107,502 teaches a microwave oven with a traditional rectangular shape outer case and a semi-circular cavity.

Another problem is that in the modern kitchen, there are many other types of cooking or heating devices besides and oven or microwave oven. There are generally toasters, broilers, grills, rotisseries. These appliances all take up valuable kitchen counter space and lead to overcrowding and increased costs. There have been several attempts in the prior art to combine a small number of these appliances. For example, U.S. Design Pat. No. D305,969 combines a toaster with a conventional rectangular microwave oven. However, this solution only removes one of the many appliances from the cluttered kitchen counter. What is badly needed is a single appliance that conserves counter space, and combines several appliances while, at the same time, preserves an overall aesthetic appearance.

There have been several attempts to use a cylindrical heating cavity including U.S. Pat. Nos. 5,632,921, 5,990,466 and 6,011,249. However, these inventions do not have direct access into the cylinder from the side to insert and remove food. U.S. Pat. No. 4,107,502 has a side door access along the full cavity height; however, this invention uses only a semi-cylindrical cavity. This again leads to unwanted modes in the chamber.

What is badly needed is a space saving cooking appliance that has a minimum surface to volume ratio thus taking up minimum countertop space; combines several common appliances into one to again optimize the use of space, and uses either a cylindrical or spherical-like cavity for microwave heating to eliminate unwanted rectangular modes.

SUMMARY OF THE INVENTION

The present invention provides a multifunctional cooking apparatus that is capable of safely and efficiently operating as both a main oven and as several auxiliary cooking appliances simultaneously. The present invention can combine the functions of different appliances, thereby eliminating the need for multiple separate appliances and saving valuable kitchen counter top and storage space.

The present invention solves the problems discussed above with a combination cooking appliance that can neatly fit into a kitchen room corner or against a wall. While there are many possible embodiments of the present invention, the fundamental concept is that of a prism, full cylinder, flat-backed cylinder or spherical shaped case to hold a basic oven with the actual cooking space in the oven being cylindrical or spherical. With the exception of the spherical case, the oven has a flat top and bottom. The oven can usually be a microwave oven; however, any oven or heating unit is within the scope of the present invention no matter what its source of thermal energy is.

The prism shaped case has an arcuate (rounded) front. There is a vertical apex in the rear for easy fitting into a corner angle. The full cylindrical case is a complete cylinder, and the spherical unit is a section of a sphere that has a flat bottom. The flat-backed cylinder is designed to be placed against a wall or panel. All of the embodiments of the present invention are space saving; however, the prism unit is generally designed to fit into a corner and is more classical, while the spherical unit is the most modern and avant-garde.

The basic oven unit can be enhanced by adding other cooking appliances to the right and left (looking straight in) both in single tier and in double or even triple tier arrangements. Auxiliary appliances such as a broiler, a toaster, a barbecue (BBQ), rotisserie, a roaster, coffee maker, egg cooker, or a grill can be added to the basic design. Any other cooking appliance can be added to the combination embodiments of the present invention and are within its scope.

Another embodiment of the present invention is a half cylinder with a flat back, top, and bottom. This can be changed to an ellipsoid to gain more frontal space if desired. Again, the basic oven can be augmented with auxiliary appliances such as a BBQ, toaster, broiler, grill, roaster, or coffee maker.

The present invention has at least one access means or door on the front on the curved surface. This can be any type of access or door and can extend the full vertical distance or only part of the vertical distance. In various combination embodiments with auxiliary appliances, there may be several doors or access ports for the different appliances.

While a microwave oven is usually the main oven or cooking space in the embodiments of the present invention, any other types of heating or cooking means are within the scope of the present invention. The power supply and magnetron (in the case of a microwave oven) can be placed into remaining space in the structure. The auxiliary appliances can also be microwave, or can be conventional electric or other heating or cooking means and methods. There is generally a control panel in easy reach of the user that is used to control the main cooking space and the auxiliary appliances; however, various auxiliary appliances can have their own separate control panels if necessary. The control panel can be build into the door or access port, or it can be located anywhere within easy reach of the user.

It is well known that microwaves set up rectangular modes in the rectangular cooking spaces of conventional microwave ovens. These rectangular modes have hot and cold spots that make uniform cooking difficult. For this reason, almost all conventional microwave ovens have rotating turntables to move food around and avoid the hot/cold spot effect. A few conventional ovens (usually older ones) may also have mode stirrers which are some sort of rotating paddle. Cylindrical and spherical sections have more uniform modes if properly excited by the microwave source.

This leads to a more uniform temperature distribution. In many of the embodiments of the present invention, no turntable is needed due to the uniformity of the field; however, a rotating turntable and/or a mode stirrer is within the scope of the present invention and can be used.

A "philosophy" of the designs contained in the present invention is that the ovens described can cook or preheat many different kinds of food at the same time. For example, one could cook pizza in one of the microwave main ovens, a whole chicken in a rotisserie, bread in a toaster, etc. There is no waiting time as is the case with a single microwave oven. A family desiring to have dinner does not have to wait for individual items to cook in a single oven. Conventional microwave ovens are sometimes advertised to be able to do anything (in terms of types of cooking); however, because the conventional prior art oven can only cook one thing at a time in one mode, people wanting to simultaneously do different types of cooking must wait. The present invention solves this waiting problem.

DESCRIPTION OF THE FIGURES

The present invention is described and illustrated by the following figures.

It should be understood that the above mentioned figures are for illustration only. Many other embodiments and designs are possible and are within the scope of the present invention.

DETAILED DESCRIPTION

Figure 1:
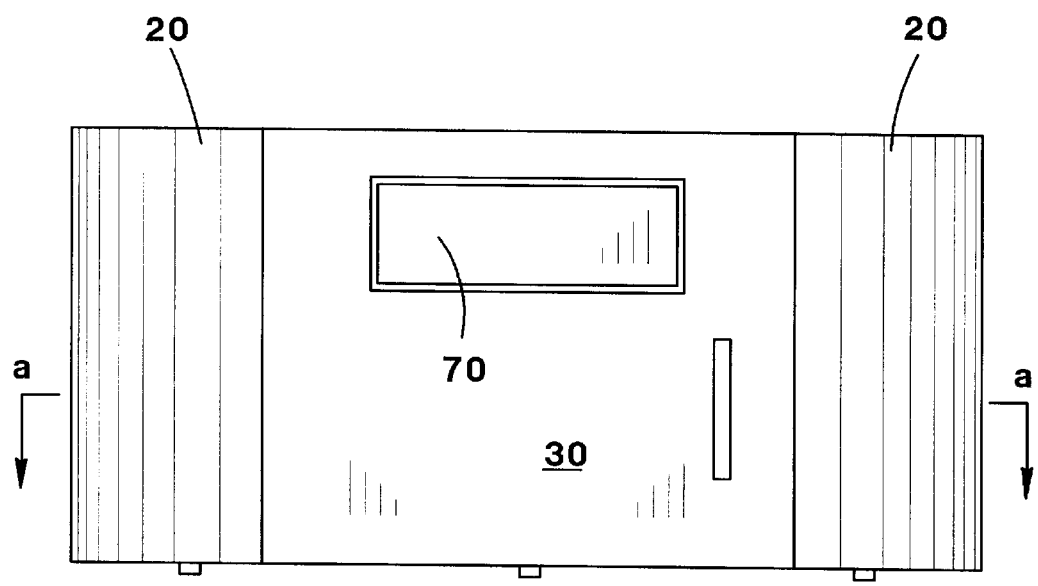
FIG. 1 is a front view of a prism shaped embodiment of the present invention that has a arcuate front.
Figure 2:
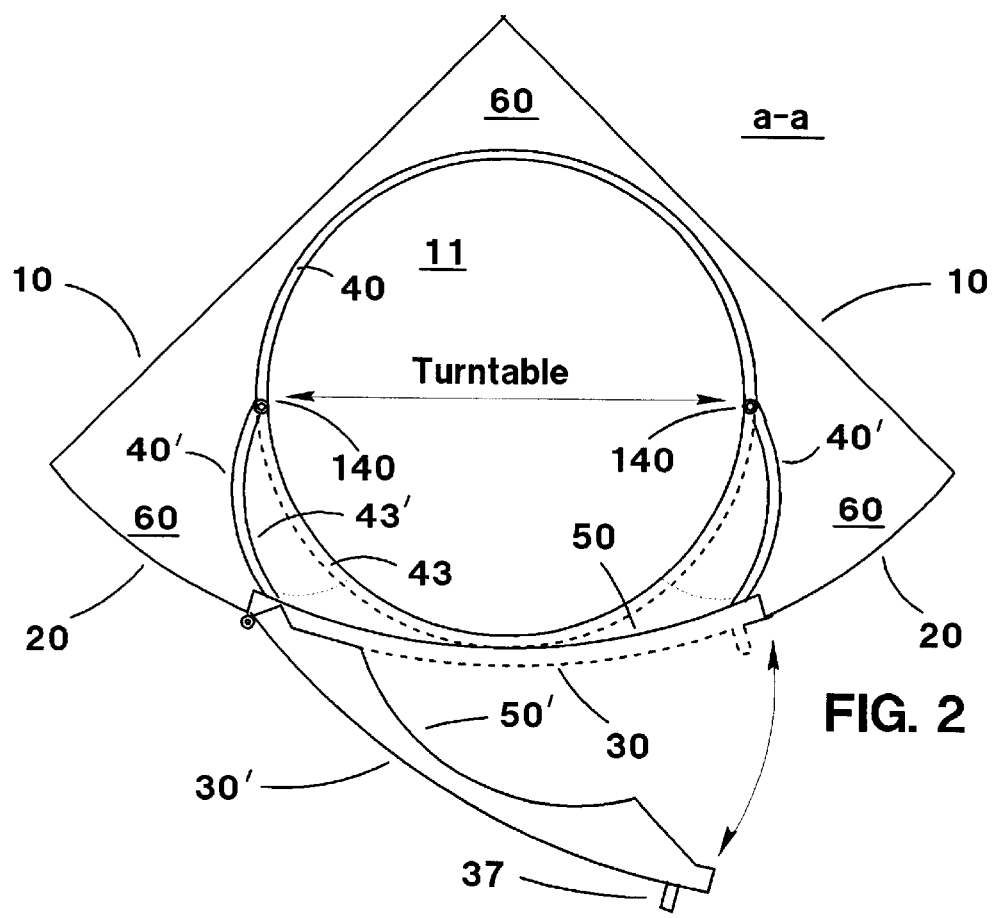
FIG. 2 is a top view of the embodiment of FIG. 1.

FIG. 1 shows a front view of an embodiment of the present invention, FIG. 2 shows a top view of the same embodiment. A curved front 20 joins a prism shaped back body panel or case 10. The back case has an vertical apex that fits into a room corner as the unit sits on a kitchen countertop. The curved or arcuate front 20 is joined by a an arcuate door 30 that opens outward for the insertion and removal of food. Interior to the case is a cylindrical cooking compartment 11. This cavity fits into a space 40 that is adapted to receive it. The cavity can form a cylindrical microwave cavity. This cavity 11 can have a left and right hinged shell piece 40' that have inner surfaces 43' that when closed, complete the cylindrical shape of the cavity 43 along with a cylindrical cutout 50 in the door. Thus, when the door 30 is closed, the cavity is an almost perfect cylinder, and when the door is open the side shells 43 can also open outward increasing the effective access area of the door. The present invention does not depend on the side shells to function. A control panel 70 can be installed onto the door 30 to control the functioning of the oven. Two machine compartments 60 can be located on each side of the cavity, and a third 60' can be located behind the cavity for electronics and a magnetron in the case of a microwave oven.

Figure 3:
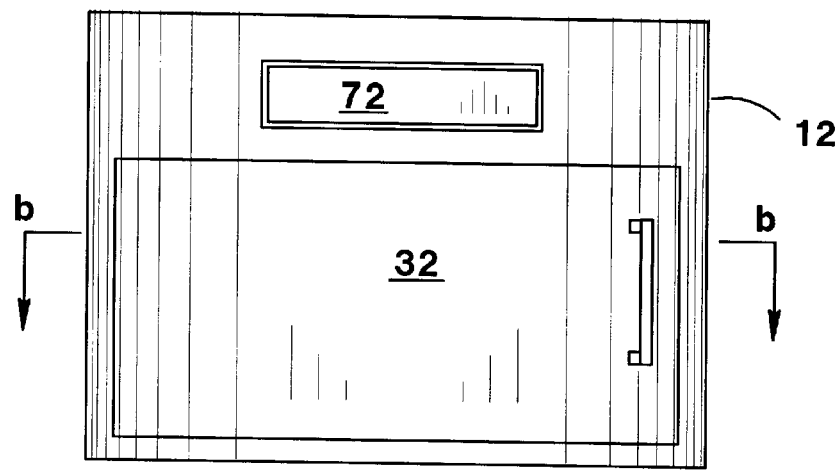
FIG. 3 is a front view of a different embodiment where the outer case forms a cylinder.
Figure 4:
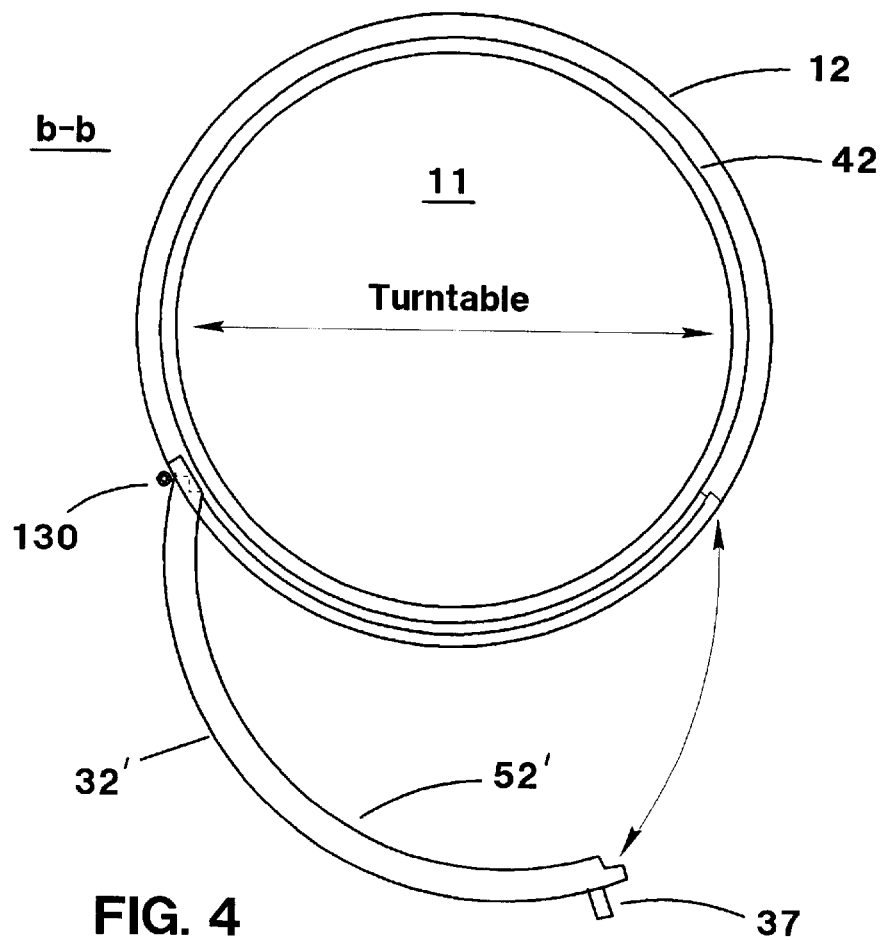
FIG. 4 is a top view of the embodiment of FIG. 3.

FIG. 3 and FIG. 4 show a different embodiment of the present invention. Here The entire appliance is cylindrical. Again there is a door 32 and a control panel 72. The cooking space 11 is cylindrical with the inner surface of the door 52 completing the cylinder when the door is closed. In FIG. 3, the door 32 usually does not extend the entire distance vertically. The electronics and magnetron can be located above the cooking area. The operation of this embodiment is the same as the first embodiment of FIGS. 1–2. The difference is in the outer shape of the case.

Figure 5:
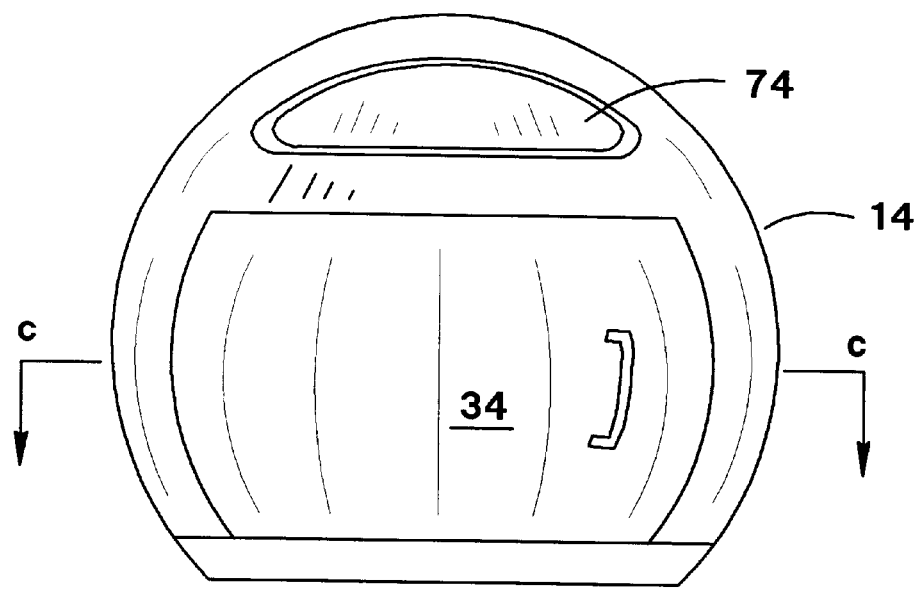
FIG. 5 is a front view of a spheroidal embodiment.
Figure 6:
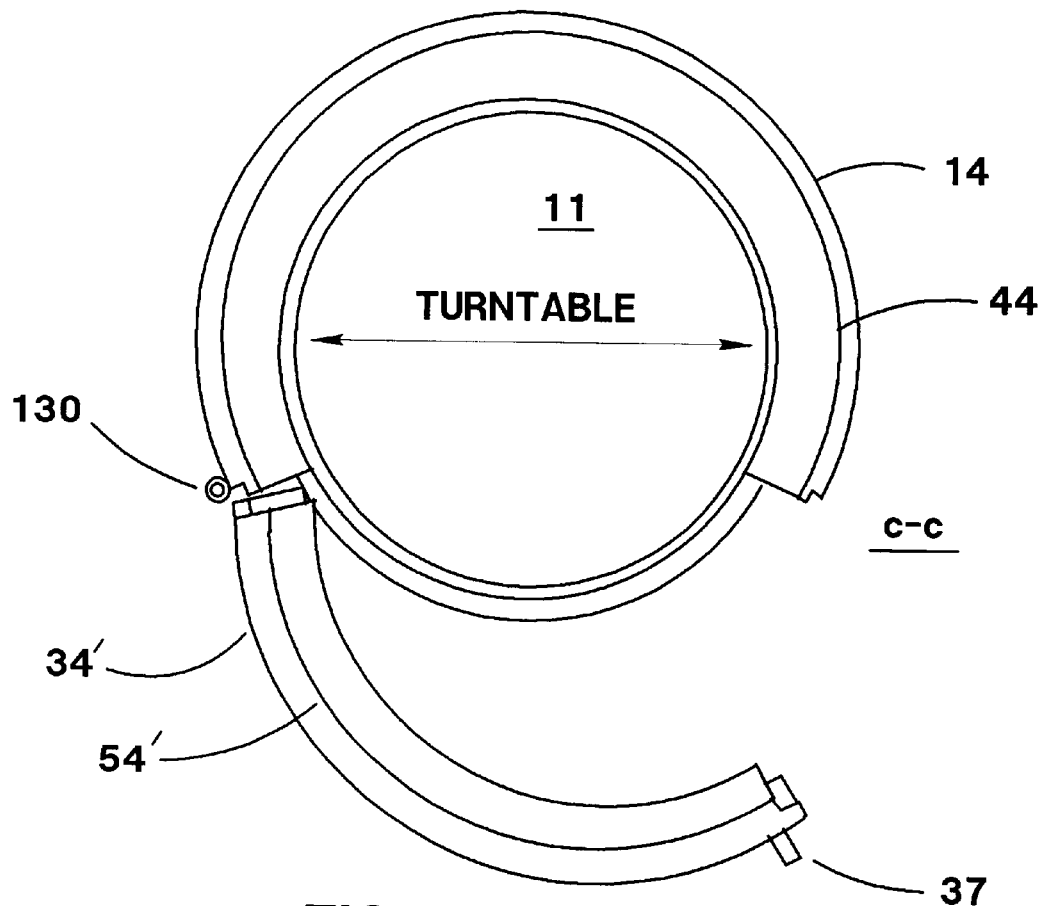
FIG. 6 is a top view of the spheroidal embodiment of FIG. 5.

FIGS. 5–6 show a partial spherical embodiment of the present invention. A spherical case 14 has a door 34 that completes the sphere when closed. The inner surface of the partially spherical cooking cavity 11 is completed by the inner surface of the door 54 when the door is closed. An inside wall 44 forms this cavity 11. Here the bottom of the appliance is flat. The exact vertical point where this cut of the total spherical shape is made is optional and can be chosen to enhance the functional and aesthetic properties of the oven. It is possible to extend the spherical shape further down and locate the electronic components under the turntable. although usually the components are above the cavity for ease in coupling the magnetron to the cavity. The top of the sphere above the door 34 can contain a control panel 74, shaped to be aesthetically pleasing, which controls the electronics that can be located in the top of the sphere. The spherical-like sidewall 44 reflects microwaves and leads to a more uniform mode in the cavity causing a more uniform field and hence heat distribution. It is possible to construct this embodiment with or without a turntable. The outer case 14 follows the general spherical shape.

It should be noted that the embodiments of the present invention do not need windows in oven doors. Windows (while optional) are general superfluous and unnecessary. All data that the user needs can be obtained from the control panel such as temperature, time, humidity, etc. If something is wrong, the oven's control system can shut down power and turn on an audio alarm to inform the user.

Figure 7A:
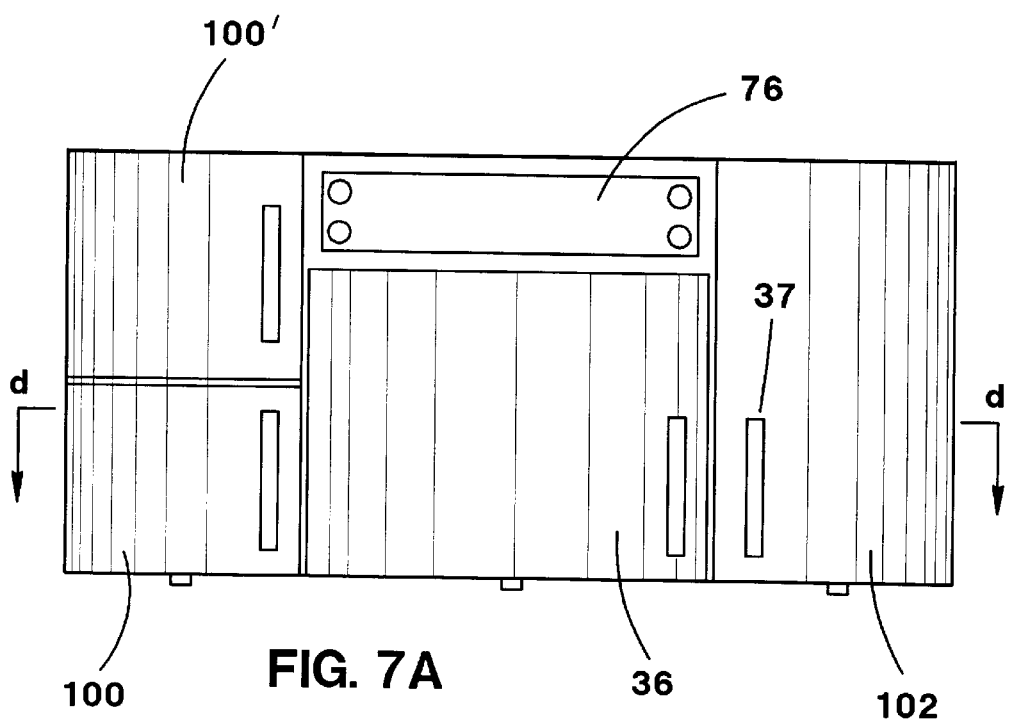
FIGS. 7A–7D show a front view of several combination appliance embodiments of the corner or prism type.
Figure 7B:
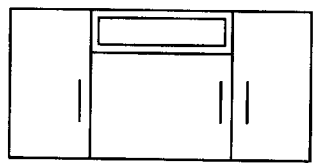
Figure 7C:
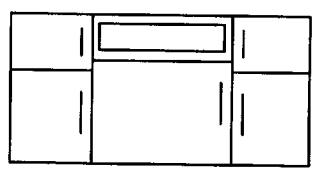
Figure 7D:
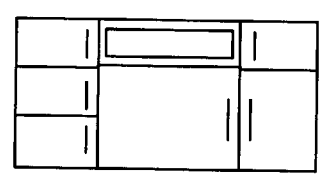

FIGS. 7A, 7B, 7C, and 7D show a front view of an embodiment of the present invention that is a combination of several cooking appliances. The central portion of the combination can be an oven 36 with the preferred method using a microwave oven. Above the oven can be located a central control panel 76 for all the appliances. It is also possible to use separate control panels. To the left and right of the central oven 36 can be located auxiliary appliances. FIG. 7A shows a toaster door 100, an oven broiler door 100' on the left and a carousel rotisserie door that turns on a vertical axis and a BBQ 102 on the right. FIGS. 7B, 7C, and 7D show variations with various appliances of different sizes in various positions. Any possible auxiliary cooking appliance is within the scope of the present invention, and any arrangement left or right or stacked is possible. The most common auxiliary appliances are a toaster, BBQ, rotisserie, coffee maker, egg cooker, roaster, or grill; however many other types of appliances are possible.

Figure 8:
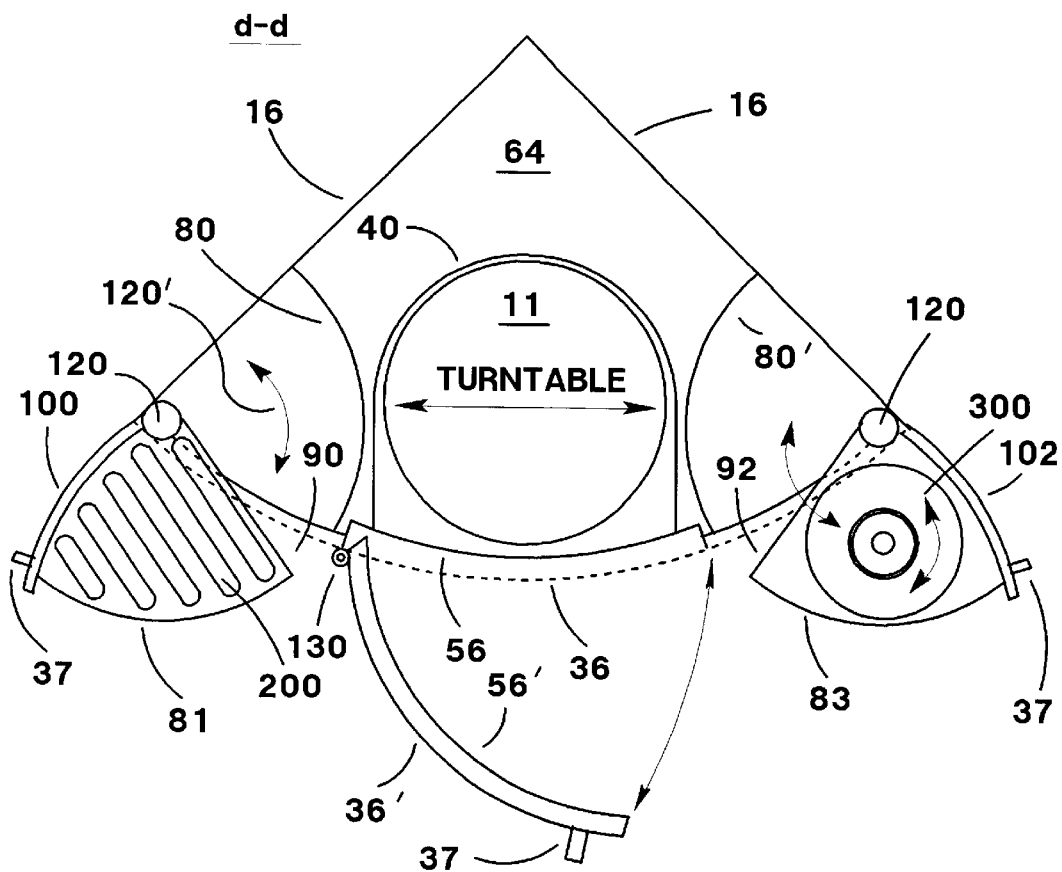
FIG. 8 is a top view of the combination appliance embodiments of FIG. 7.

FIG. 8 shows a top section view of the combination embodiment of FIGS. 7A–7D. An outer case 16 of this embodiment is prism shaped with a vertical apex at the back to fit a room corner. A main oven cooking space 11 with a semi-circular back 40 is seen and is similar to the cooking spaces described in previous embodiments. On the left side can be seen a toaster shelf 81 with a door 100 which can be opened outward. The toaster door 100 completes the arcuate face of the unit by matching the curvature of the main door 36. Bread can be inserted in vertical slots 200 to be toasted. On the right side can be seen a vertical carousel rotisserie 300 and BBQ with a door 102 that can open outward and a lower shelf 83 attached to the door. On each side of the oven, space 80 is made for the auxiliary doors to rotate inward along an arc 120' controlled by a vertical hinge 120. All doors can have handles 37 for ease in opening. A machine compartment 64 takes up the space behind the cavity 11 as well as above the cavity 11 behind the control panel 76.

Figure 9:
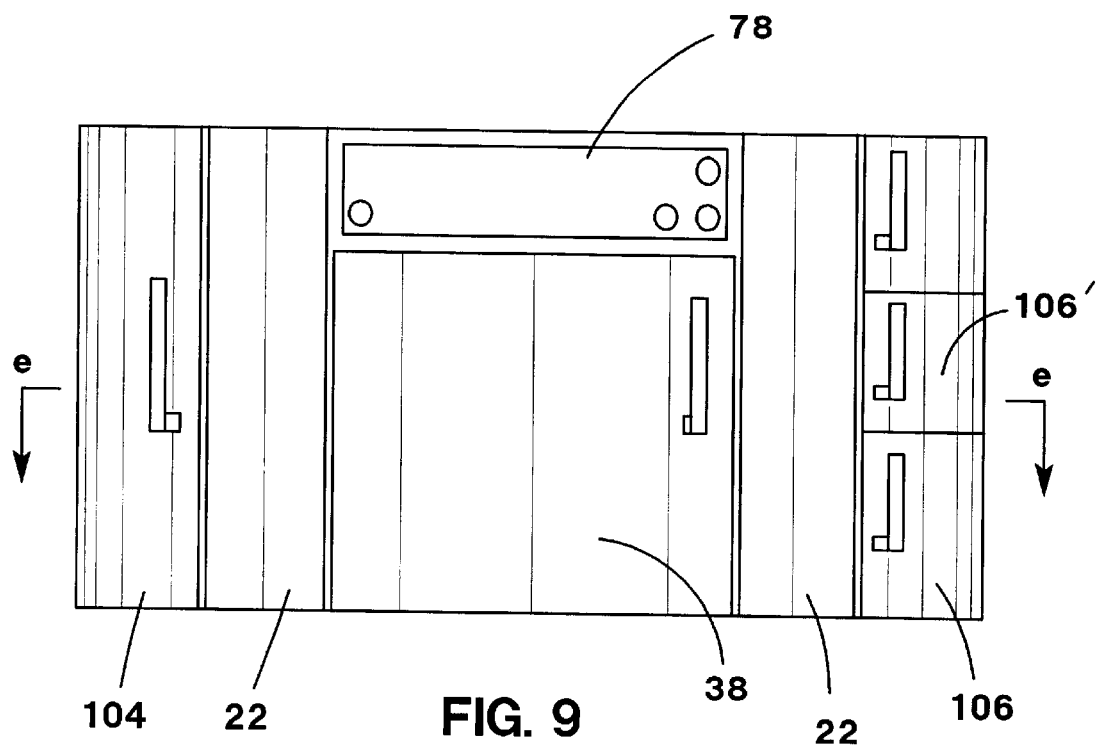
FIG. 9 is a front view of semi-circular embodiment.
Figure 10:
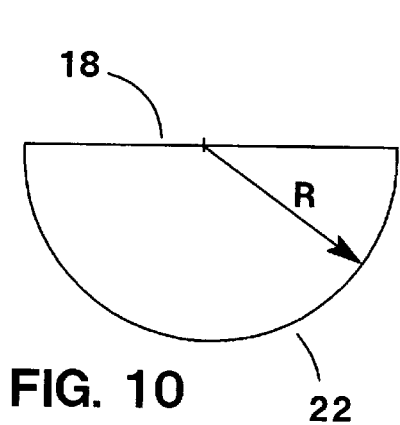
FIGS. 10 and 11 are possible top views of the embodiment of FIG. 9.
Figure 11:
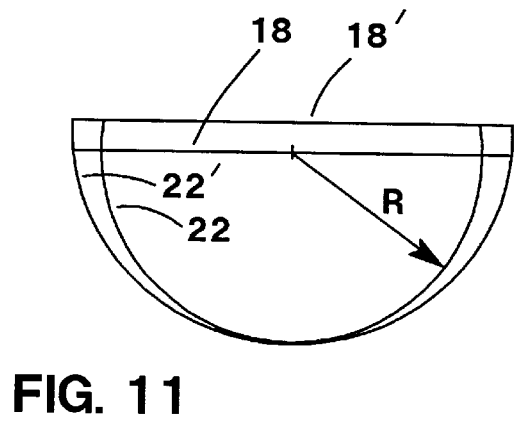

FIGS. 9, 10, and 11 show a front view a half-ellipsoidal embodiment unit with top section outline of the entire unit. In particular the shape of the unit can be semi-circular 22 as in FIG. 10 or elliptical 22' as in FIG. 11. Again a door 38 leads into an oven space 18, 22. This door completes the internal shape of a full cylindrical cavity. The unit can be however flat on the back panel 18, and thus can form half of an elliptical cylinder. A control panel 78 is shown above the door; however, this panel can be located anywhere including on the door 38 as in other embodiments. On the left is shown a taller space 104 with another door that could contain any taller auxiliary appliance such as a carousel rotisserie and/or BBQ. On the right is shown three smaller auxiliary appliances 106 which could be any of the types appliances already described such as a toaster, roaster, oven/broiler, egg cooker, and many others that are within the scope of the present invention. The extension of the front shape from semi-circle to elliptical can be made to create more room for the optional side units. Also, the back panel 18 of the unit can be expanded backward 18' to create more room for electronics, etc.

Figure 12:
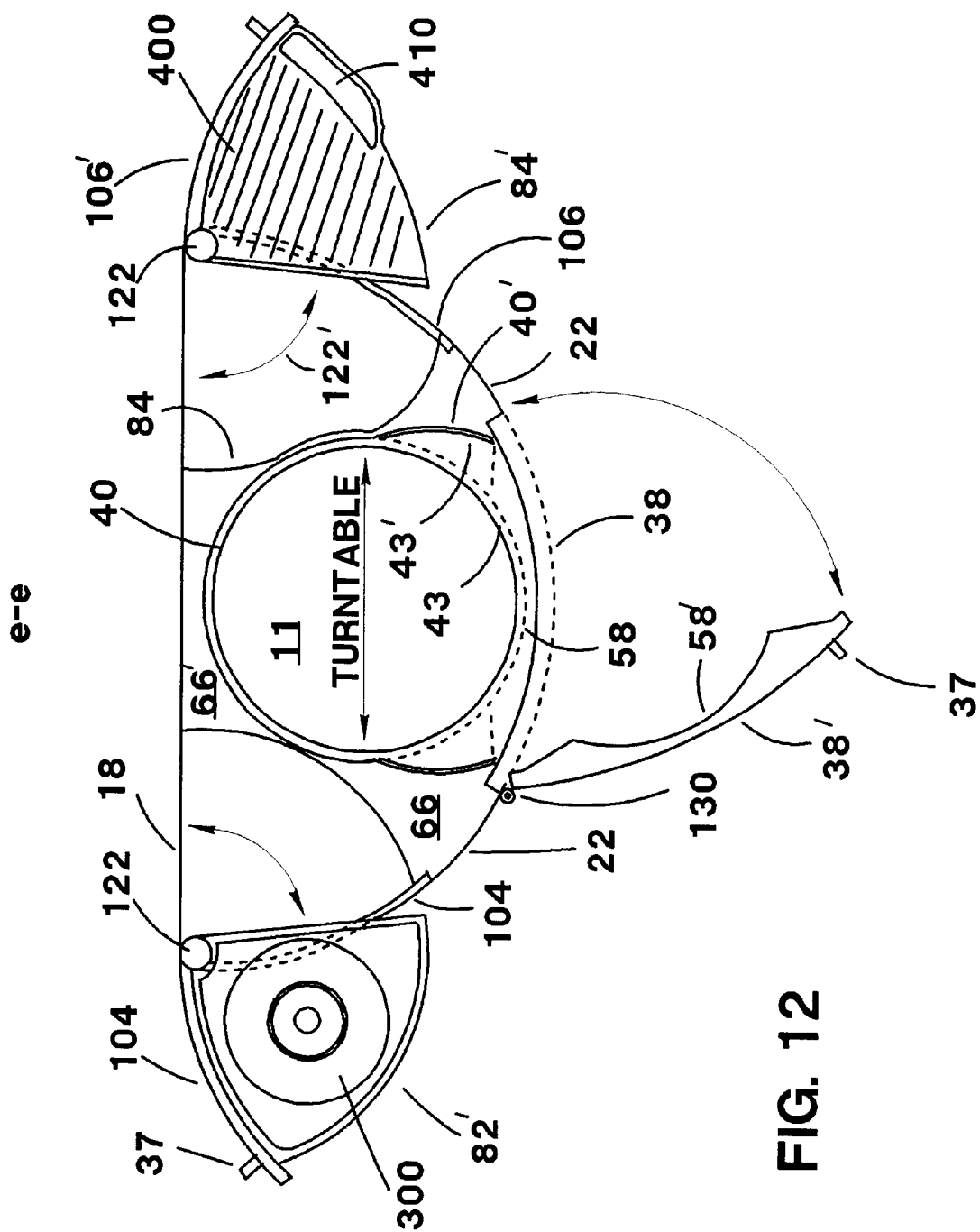
FIG. 12 is a top view of a combination embodiment.

FIG. 12 shows a top section view of the embodiment of FIGS. 9–11 with a cylindrical cavity 11 with a cylindrical wall 40. Again a door 38, when closed, forms part 58 of the full circular wall of the cavity 11. Side wings or panels 43 again widen the door opening. Side doors left 104' and right 106' rotate open and complete the semi-circular or elliptical shape when closed. These doors rotate open on hinges 122. Each of the side units, where one (bottom) or two (bottom and top) shelves 82' and 84' are attached to the doors 104' and 106', complete the construction by being hinged on the two hinges 122. On the left side is shown a carrousel rotisserie 300, and on the right side is shown a champ grill 400 with a tray 410 for grease. Again it should be noted that the arrangement of the side units is somewhat arbitrary (but modular), with any of the previously named auxiliary appliances being able to be substituted for others. Again, it must be remembered that either side, or both, can be stacked vertically as shown in FIG. 9 on the right side. In this case, at even three different auxiliary appliances could appear on either side. In this embodiment, the machine space 66 and 66' can be used to house extra electronics. The magnetron for a microwave system and larger electronics would be located in a mechanical space above the cavity and behind a control panel 78.

Figure 13:
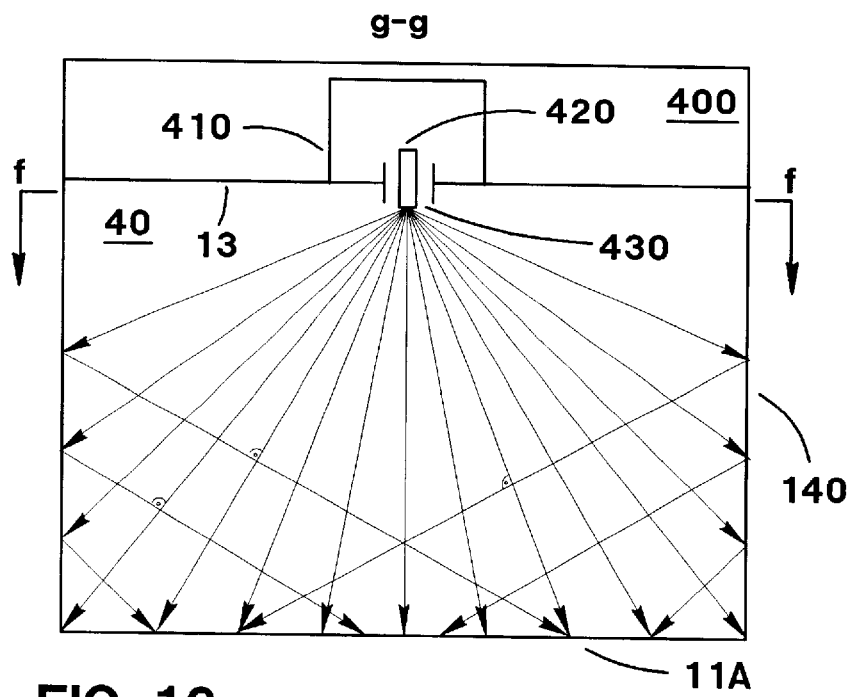
FIG. 13 shows ray tracing of microwave reflections in cylindrical cavity from a side section view.
Figure 14:
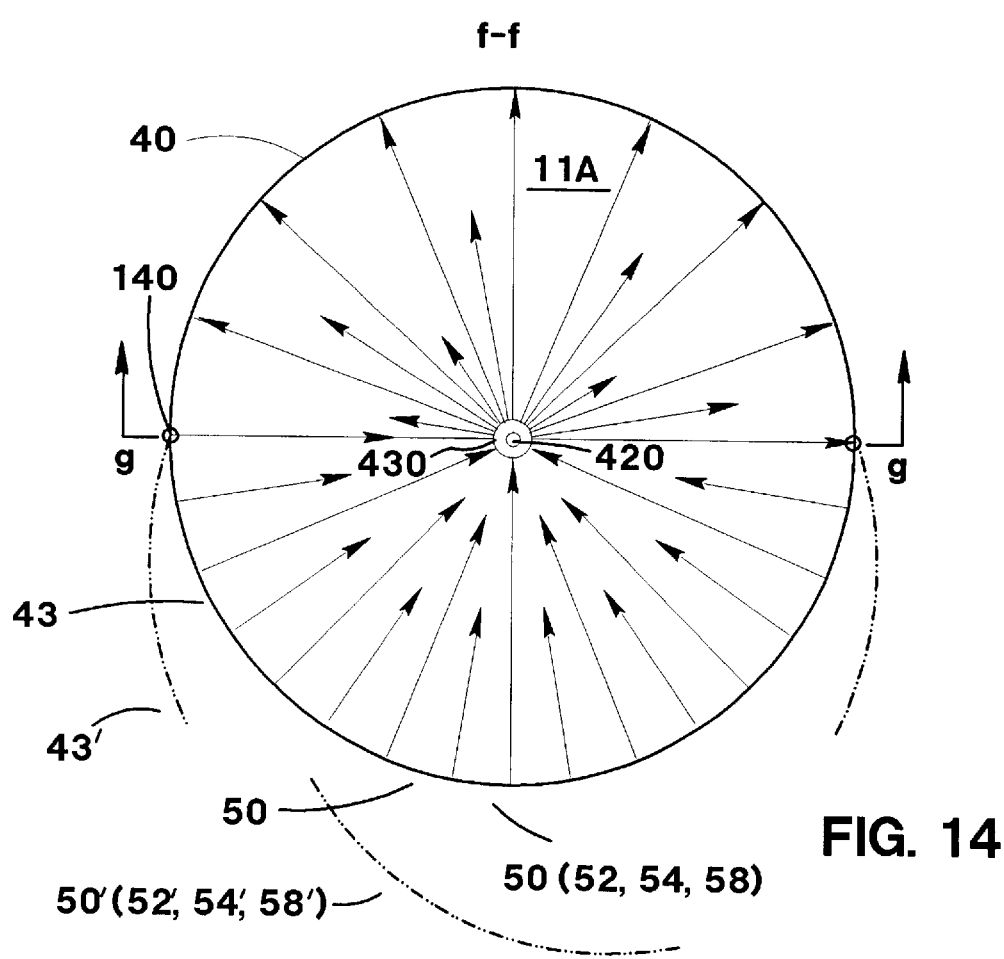
FIG. 14 shows ray tracing in the cavity of FIG. 13 from a top view.

FIGS. 13 and 14 show a ray tracing rendition of wave reflections within a cylindrical microwave cavity. FIG. 13 is a side sectional view, and FIG. 14 is a top view. The cavity excitation is shown as a point source in the central point of the top of the cylindrical cavity. In practice, this would be a microwave source designed to excite a radial electric field mode leading to relatively uniform field distribution throughout the cavity. Cylindrical cavity modes are well known in the art of microwaves; their uniformity will lead to a much more uniform heating profile of food (absorbing material) in the cooking area.

In FIG. 13, a machine compartment 400 can rest above a cavity 11A. A magnetron 410 can be mounted over an opening 430 where an antenna 420 terminates from the magnetron. The top of the cavity 13 separates the machine compartment from the cooking cavity. Microwave reflections are shown reflecting from the circular cavity walls 40 and the flat floor 11A. FIG. 14 shows the same cavity from the top. In this figure, wings 43' complete the closed shape of the cavity 43 on each side of the door 50 when the door is closed. These wings 43' open on hinges 140. The door 50 is also cylindrical and completes the shape.

Prior art box-like microwave cavities create chaotic distribution of microwaves leading to modes with many hot spots and cold spots. The typical microwave oven has a turntable to rotate the food to compensate for this and allow more uniform cooking. The cylindrical cavity of FIGS. 13 and 14 allows microwaves to make radial reflections off the cylindrical walls allowing direct penetration of primary energy into the food. The idea is that waves only reflect one time from the walls before being absorbed by the food. Of course, food also receives direct energy from the microwave source with no reflections.

Figure 15:
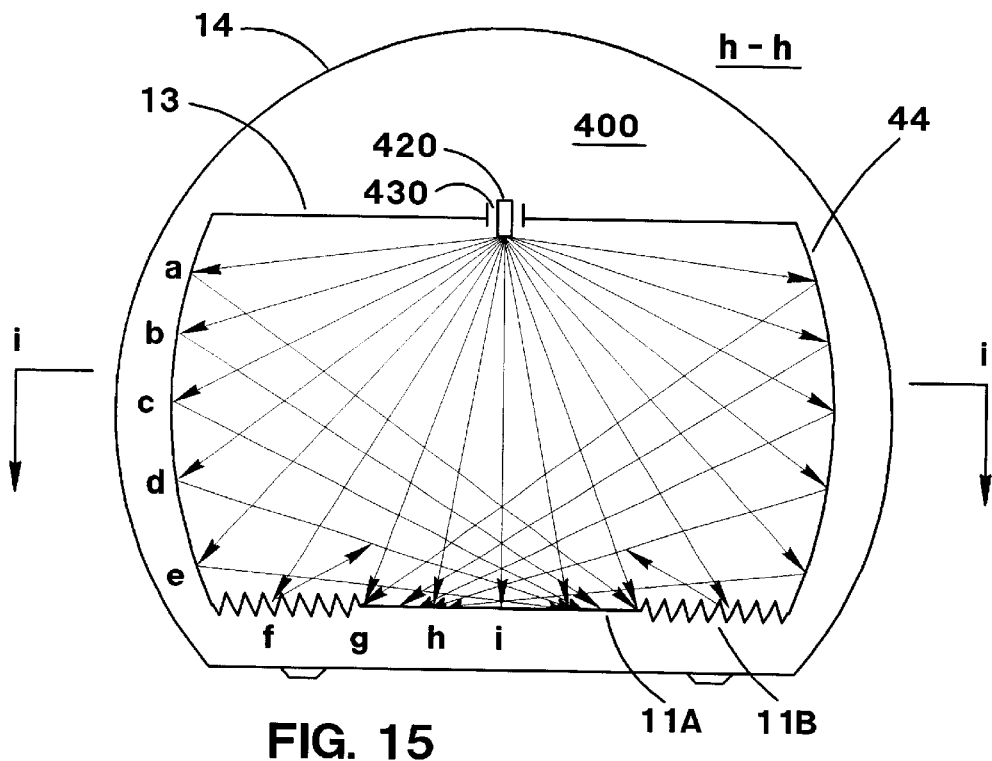
FIG. 15 shows ray tracing of microwave reflections in a partially spherical cavity.
Figure 16:
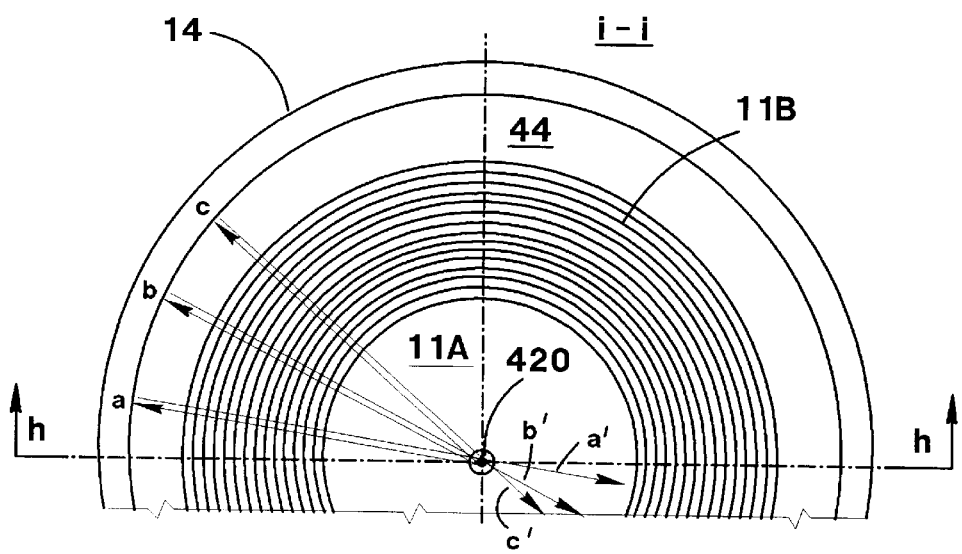
FIG. 16 shows ray tracing in the cavity of FIG. 15 from a top view.

FIGS. 15 and 16 show a similar ray tracing in a partially spherical cavity. Again a machine compartment 400 can be seen as well as a microwave source 420 and a hole 430 in the top of a cooking area. This cooking area also has a flat top 13 and bottom. Waves reflect off spheroidal walls 44 and off the bottom. A series of corrugations or grooves 11B can be etched or carved into the bottom. The center portion 11A of the bottom can be smooth with no grooves. The grooves help distribute the microwave reflections into regions of the food that normally are less exposed to microwaves and stay colder. Also, the food molecules are exposed to microwaves of several polarities causing thermal vibration along different axes. Some rays reflect from the sides of the cavity a–e, other rays reflect from the flat part of the bottom h–i, and some rays reflect from the corrugations f–g.

It should be understood that the above described embodiments are for illustrative purposes only. It will be recognized by those skilled in the art that numerous changes and variations can be made in the design without departing from the teaching and scope of the invention.

I claim:

1. A space saving cooking appliance comprising:
   an outer case with a front and rear surface, said front surface being arcuate;
   a cylindrical microwave cooking space contained in said case, said cylindrical microwave cooking space having a cylindrical surface;
   an access means into said cylindrical cooking space for inserting and removing food, said access means closed by a hinged arcuate door, said door having an outer radius of curvature and an inner radius of curvature, said outer radius of curvature being greater than said inner radius of curvature;
   left and right shell pieces with inner and outer surfaces inside said arcuate door, said shell pieces closing when said arcuate door closes, the inner surface of said shell pieces completing said cylindrical surface when said arcuate door is closed.

2. The space saving cooking appliance of claim 1 wherein said rear surface of said outer case being prism shaped with an apex for fitting an interior room corner.

3. The space saving cooking appliance of claim 1 further comprising at least one alternate cooking space, said alternate cooking space located left or right of said cylindrical cooking space.

4. The space saving cooking appliance of claim 3 wherein said alternate cooking space contains a toaster.

5. The space saving cooking appliance of claim 3 wherein said alternate cooking space contains a rotisserie.

6. The space saving cooking appliance of claim 3 wherein said alternate cooking space contains a coffee maker.

7. The space saving cooking appliance of claim 3 wherein said alternate cooking space contains a broiler.

8. The space saving cooking appliance of claim 3 wherein said alternate cooking space contains a grill.

9. The space saving cooking appliance of claim 3 further comprising a second alternate cooking space.

10. The space saving cooking appliance of claim 9 wherein said said alternate cooking space and said second alternate cooking space being positioned left and right of said cylindrical microwave cooking space.

11. A space saving cooking appliance with a microwave oven of the type used to cook or heat food comprising a front arcuate room-facing surface with a hinged arcuate door allowing insertion and removal of food;

a partially cylindrical interior region forming a microwave cooking space, said microwave cooking space containing a substantially flat turntable;

at least one alternate cooking space to the left or right of said partially cylindrical cooking space, said alternate cooking space swiveling outward to make said alternate cooking space available for access and/or cooking and swiveling inward for storage and/or cooking, said alternate cooking space having an arcuate front cover, said arcuate cover mating with said arcuate room-facing surface when said alternate cooking space swivels inward, said alternate cooking space pivotally connected to said outer case so that said alternate cooking space can swivel.

12. The space saving cooking appliance of claim 11 further comprising said alternate cooking space including a plurality of cooking devices stacked vertically.

13. The space saving cooking appliance of claim 11 wherein said alternate cooking space includes a toaster.

14. The space saving cooking appliance of claim 11 wherein said alternate cooking space includes a rotisserie.

15. The space saving cooking appliance of claim 11 wherein said alternate cooking space includes a broiler.

16. The space saving cooking appliance of claim 11 wherein said alternate cooking space includes a grill.

17. A space saving cooking appliance with a microwave oven of the type used to cook or heat food comprising:

a front arcuate room-facing surface with an arcuate door allowing insertion and removal of food;

a cylindrical interior region with a front cylindrical surface forming a microwave cooking space, said microwave cooking space containing a substantially flat turntable;

a prism shaped outer case with a flat top and bottom surrounding the cylindrical cooking space; this outer case having a rear vertical apex matching a room corner, this case mating with the front arcuate room-facing surface, at least one alternate cooking space to the left or right of said cylindrical cooking space, said alternate cooking space swiveling outward to make said alternate cooking space available for access and/or cooking and swiveling inward for storage and/or cooking, said alternate cooking space having an arcuate front cover, said arcuate cover mating with said arcuate room-facing surface when said alternate cooking space swivels inward, said alternate cooking space attached to said outer case by a hinge that allows said alternate cooking space to swivel.

18. The space saving cooking appliance of claim 17 further including left and right shell pieces with inner and outer surfaces inside said arcuate door, said shell pieces closing when said arcuate door closes, the inner surface of said shell pieces completing said front cylindrical surface when said arcuate door is closed.

19. The space saving cooking appliance of claim 17 wherein said arcuate door has in inner radius of curvature and an outer radius of curvature, said outer radius of curvature being larger than said inner radius of curvature.

20. A microwave oven comprising a curved front face and a pivotably connected door, said door having an outer and inner surface and opening into said curved front face, each of said outer and inner surfaces of said door having at least one radius of curvature, the radius of curvature of said outer surface of said door different from the radius of curvature of said inner surface of said door, with said microwave oven also containing a substantially cylindrical cooking area, a substantially circular turntable, and a microwave generating means for launching microwaves into said substantially cylindrical cooking area.

21. The microwave oven of claim 20 further comprising left and right alternate cooking areas each having a separate curved door located left and right of said pivotably connected door.

22. A microwave oven apparatus comprising an oven enclosure defining a circular microwave oven cavity and an access opening for the cavity; the enclosure including a pivotable door for normally closing the opening; the enclosure including a pair of shell members; the shell members and the door co-operating to define a portion of the circular microwave oven cavity.

* * * * *